United States Patent
deHaas

[15] 3,653,640
[45] Apr. 4, 1972

[54] APPARATUS FOR PREPARING AND DISPENSING A MIXTURE OF AT LEAST TWO LIQUIDS

[72] Inventor: Hendrik Antoon Lorentz deHaas, Loenersloot, Netherlands

[73] Assignee: Berg & Burg N.V., Breukelen, Netherlands

[22] Filed: May 29, 1969

[21] Appl. No.: 829,050

[30] Foreign Application Priority Data

June 6, 1968 Netherlands...........................6807971

[52] U.S. Cl..................................259/4, 210/321, 137/93
[51] Int. Cl....................B01f 15/00, B01d 13/00, C02b 1/82
[58] Field of Search........................259/8, 4, 18, 154; 137/93; 210/23, 321

[56] References Cited

UNITED STATES PATENTS

| | | | |
|---|---|---|---|
| 2,461,334 | 2/1949 | Major | 259/4 UX |
| 2,559,090 | 7/1951 | Potter | 137/93 |
| 3,266,780 | 8/1966 | Waters | 259/4 |
| 3,352,779 | 11/1967 | Austin et al. | 210/23 |
| 3,457,944 | 7/1969 | Cary et al. | 210/321 X |
| 3,515,275 | 6/1970 | Bowman | 210/321 X |
| 2,720,879 | 10/1955 | Gasca et al. | 210/321 X |
| 3,186,917 | 6/1965 | Gerhardt et al. | 210/321 X |
| 3,406,826 | 10/1968 | Willock | 210/321 X |

Primary Examiner—James Kee Chi
Attorney—Waters, Roditi, Schwartz & Nissen

[57] ABSTRACT

An apparatus for preparing and dispensing a dialysate for an artificial kidney by mixing a concentrated salt solution with softened water in the required mixing ratio, having a mixing tank, a pump for periodically feeding a measured quantity of concentrate from a storage tank to the mixing tank, an inlet conduit comprising a shut-off type valve for feeding water to the mixing tank after the concentrate has been pumped into this tank and a loop-shaped syphon discharge tube for discharging the mixed liquid from the mixing tank. The upper loop portion of the syphon tube is arranged adjacent the upper portion of the mixing tank and contains two electrodes of a liquid responsive control circuit which controls the shut-off valve to close this valve at the moment the liquid reaches the level of said loop portion and thereby starts to flow out of the mixing tank through the syphon discharge tube.

16 Claims, 1 Drawing Figure

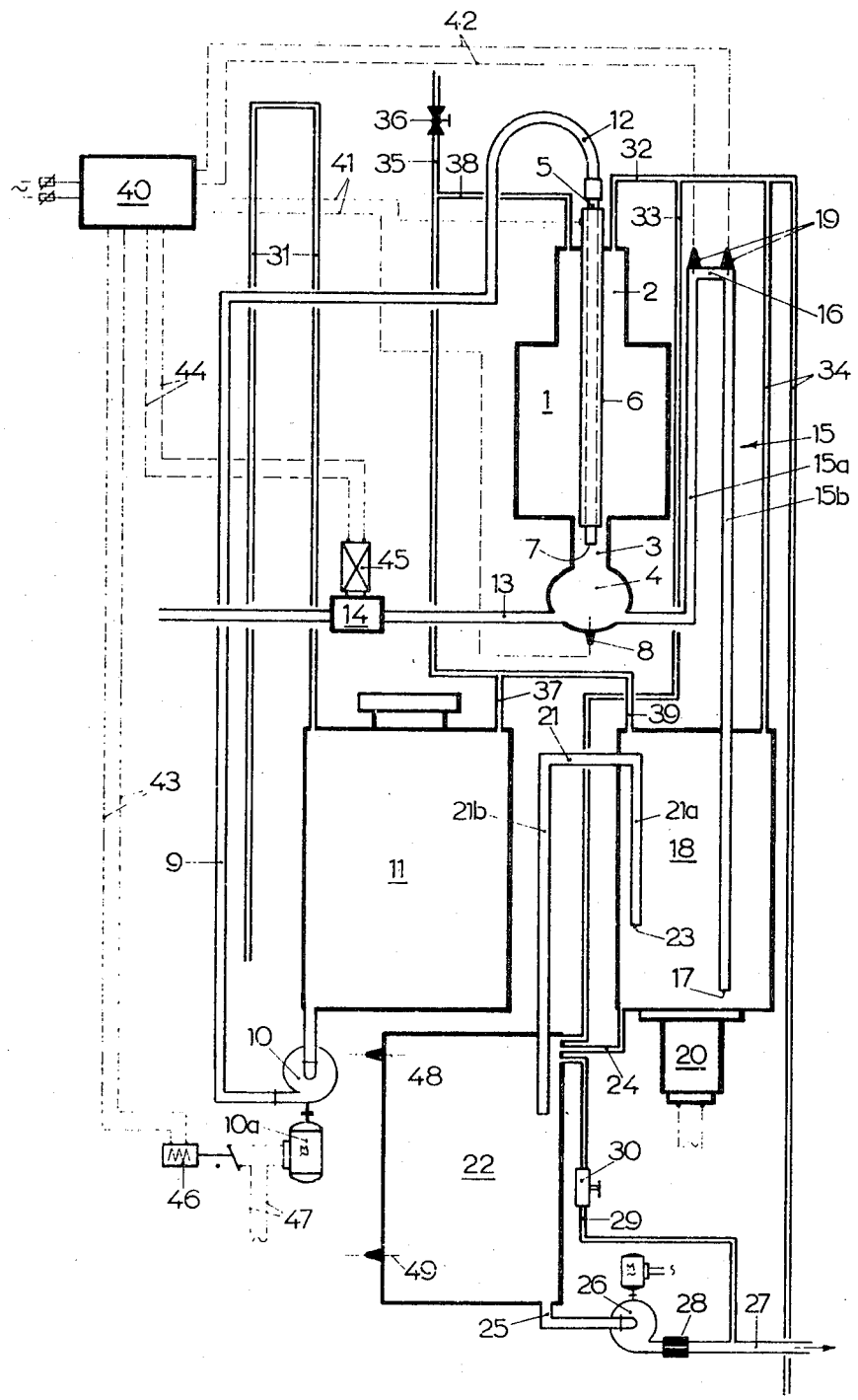

APPARATUS FOR PREPARING AND DISPENSING A MIXTURE OF AT LEAST TWO LIQUIDS

BACKGROUND OF THE INVENTION

The invention relates to an apparatus for preparing and dispensing a mixture of at least two liquids in a predetermined mixing ratio, and more particularly to such an apparatus of the type in which measured quantities of a first and a second liquid are periodically fed to a mixing tank by means of two controlled supply means for said two liquids, respectively, and in which the mixed liquid so obtained is periodically discharged from the mixing tank through a discharge conduit connected to this tank.

The invention is concerned with a mixing apparatus of this type which is especially adapted to be used in case at least one of the liquids to be used has an aggressive character. More particularly the invention is concerned with an apparatus of this type for preparing and dispensing a dialysate for an artificial kidney installation.

In the preparation of a dialysate for an artificial kidney a concentrated salt solution must be mixed with softened water in a constant mixing ratio of about 1:35 which mixing ratio should have exactly the required value. The amount of dialysate which the apparatus is required to dispense during the operation of the artificial kidney is generally in the order of half a liter per minute.

In the preparation of the dialysate for an artificial kidney it is obviously essential that the mixing apparatus used therefor should be able to operate with a very high degree of reliability and without any possibility of contamination of the prepared mixture. For this reason it should be prevented as far as possible that the aggressive salt solution can come into contact with and deposit salt crystals on sensitive parts of the apparatus, such as the seals of valves, plunger pumps and the like, since such crystal deposits lead to an early wear and failure of such parts.

SUMMARY OF THE INVENTION

A primary object of the invention is to provide a mixing apparatus of the type described in which the use of mechanical parts susceptible to wear and failure is suppressed to a minimum.

A further object of the invention is to provide such a mixing apparatus in which instead of the conventional valves, plunger pumps and similar parts syphon systems are utilized for the control of the correct composition of the mixed liquid and for the transfer of this mixed liquid from the mixing tank to one or more succeeding tanks.

A further object of the invention is to provide a mixing apparatus of this type which is reliable in use and can be manufactured at relatively low cost.

In the apparatus according to the invention the discharge conduit for mixing tank comprises a syphon tube having an upstanding leg rising from the bottom level of the mixing tank to a level corresponding to a predetermined liquid level in said tank and having a depending leg extending downwardly past the bottom level of said tank, said syphon tube comprising control means in its highest loop portion responsive to the presence of liquid in said loop portion. The two liquid supply means for the two liquids to be mixed may be so controlled that first the supply means for the first liquid is put in action for a period of time for feeding a measured quantity of this first liquid to the mixing tank and thereafter the liquid supply means for feeding the second liquid to the mixing tank is actuated, the control means in the syphon tube upper loop portion causing said latter supply means to be shut-off at the moment the mixed liquid reaches the level of said loop portion and thereby starts to flow out of the mixing tank through said syphon tube.

The mixed liquid is thus discharged from the mixing tank as soon as the correct mixing ratio is obtained in which this liquid need not flow through a valve or similar mechanical part.

In case one of the two liquids to be mixed is of an aggressive character, as for instance the concentrated salt solution used in the preparation of the dialysate for an artificial kidney, this liquid is preferably first brought into the mixing tank. In this case the supply means for this aggressive liquid may comprise a liquid storage tank and a pump means which, when at rest, allows a free return flow therethrough, such as for instance a centrifugal pump. This pump means may be connected between the storage tank and the rising leg of a loop-shaped feed tube having its other leg extending downwardly into the mixing tank from the upper side thereof to a selected level in this tank, the storage tank and pump means being arranged below said latter level. A further liquid level responsive control means may be arranged inside the mixing tank at a small distance above the lower discharge opening of the feed tube, said second control means controlling the shutting-off of the pump means whereby after such shutting-off a small quantity of liquid is returned from the mixing tank to said storage tank through syphon action of the feed tube until the liquid level has dropped to the level of the lower opening of the feed tube.

The level of the outlet opening of the feed tube in the mixing tank thus determines accurately the amount of aggressive liquid or concentrate which at the beginning of each operating cycle is pumped into the mixing tank without this liquid passing through a valve means or similar part. The pump means of the free return flow type makes it possible that the excess of liquid pumped into the mixing tank is returned towards the storage tank when the pump is stopped since this pump does not obstruct the syphon action of the loop-shaped feed tube. A pump of this type has the further advantage that it does not have sealing means on which salt crystals could be deposited. Pumps of this type, in particular centrifugal pumps providing a free return flow in the above described sense and adapted for displacing aggressive liquids are as such wellknown in the art.

In case the second liquid to be mixed is of a non-aggressive character and consists, for instance, of softened water, as is the case in the preparation of the dialysate for an artificial kidney, the supply means for this liquid may comprise a conventional electro-magnetically actuated shut-off valve.

The liquid level responsive control means may operate electrically and may each comprise a pair of electrodes arranged in the upper loop portion of the syphon discharge tube and in the mixing tank, respectively. Electrical control circuits comprising such a pair of spaced electrodes responsive to the presence of a conductive liquid therebetween are as such well known in the art.

BRIEF DESCRIPTION OF THE DRAWING

The sole FIGURE Of the accompanying drawing illustrates schematically an embodiment of the apparatus according to the invention for preparing and dispensing a dialysate for an artificial kidney.

DESCRIPTION OF THE PREFERRED EMBODIMENT OF THE INVENTION

The apparatus as shown comprises a primary mixing tank 1 having a capacity of for instance 4 liters. The generally cylindrical tank 1 has an upper portion 2 of reduced diameter and comprises at its lower end a tank portion 4 of approximately spherical shape connected to the main body of the tank by a tubular tank portion 3. The mixing tank is closed at its upper side and an inlet tube 5 made of glass and covered with a tubular metal electrode 6 for the greater part of its length extends through the upper side wall of the tank downwardly into the latter. The lower mouth 7 of the inlet tube 5 is situated in the narrow tubular tank portion 3 and at a small distance below the lower end of the electrode 6. A second electrode 8 projects upwardly through the bottom of the lower tank portion 4, the two electrodes 6 and 8 forming together part of an electrical level responsive switch means in a manner yet to be described.

A conduit 9 connects the inlet tube 5 to the discharge side of a centrifugal pump 10 connected on its inlet side to a storage tank 11 for a concentrated salt solution. The storage tank 11 is positioned at a lower level than the mixing tank 1 and the pump 10 is positioned below the storage tank 11, the conduit 9 extending upwardly from the pump 10 to a level above the upper wall of the mixing tank 1 to be joined through a bend portion 12 to the upper end of the glass inlet tube 5.

A second inlet conduit 13 comprising an electro-magnetically actuated valve 14 connects the spherical tank portion 4 to a source of soft water, such as a decalcinating device connected to the water mains (not shown), which source supplies the soft water at a certain pressure. The conduit 13 opens substantially tangentially into the lower side of the mixing tank portion 4 whereby, when the valve 14 is opened, the soft water flows into this tank portion with a whirling motion.

A loop-shaped syphon discharge tube 15 is connected with its short leg 15a to the bottom of the mixing tank portion 4, the short leg 15a of the syphon tube extending upwardly alongside the tank 1 to the upper loop portion 16 of the tube situated at a level just below the upper wall of the tank 1. The long leg 15b of the syphon tube 15 extends downwardly from this upper loop portion 16 past the bottom of the mixing tank 1 and into a secondary mixing tank 18, the lower tube mouth 17 being spaced a small distance above the bottom of this tank 18. Two electrodes 19 are arranged suitably spaced in the upper loop portion 16 of the syphon tube, which electrodes 19 form part of a second electrical level responsive switch means.

An electrically driven stirring device 20 is mounted in the bottom of the second mixing tank 18.

A loop-shaped syphon tube 21 connects the second mixing tank 18 to a buffer tank 22 arranged below the tank 18. The lower end 23 of the upwardly extending short leg 21a of the tube 21 is situated some distance above the mouth 17 of the discharge tube 15 and the upper loop portion of the syphon tube 21 passes outwardly through the side wall of the tank 18 close below the upper wall of this tank. The depending long leg 21b of the syphon tube 21 extends through the upper wall of the buffer tank 22 terminating at a level below the bottom of the tank 18.

A drain-pipe 24 of small cross-section extends from the bottom of the secondary mixing tank 18 to the upper side of the buffer tank 22 and allows the tank 18 to be drained completely when the apparatus has been stopped.

A conduit 25 connects the bottom side of the buffer tank 22 to a centrifugal pump 26 for feeding the dialysate through a feed line 27 to an artificial kidney of any known type (not shown). The feed line 27 comprises a measuring cell 28 of known type for checking the composition of the dialysate. A return line 29 for the pump 26 is connected between the feed line 27 and the buffer tank 22 which return line comprises a regulating valve 30.

Vent lines 31, 32, 33 and 34 are connected to the upper sides of the storage tank 11, the mixing tank 1, the buffer tank 22 and the mixing tank 18, respectively, which vent lines also serve as overflow lines or return lines during the flushing of the apparatus. For this latter purpose, a feed line 35 comprising a shut-off valve 36 and having branch lines 37, 38 and 39 connected to the tank 11, 1 and 18, respectively, is provided for feeding hot water under pressure and having a temperature of for instance 90° C. into the system.

An electrical control system generally indicated by 40 is provided for automatically controlling the functioning of the apparatus, the control system being connected by electric leads 41 with the two cooperating electrodes 6 and 8 of the mixing tank 1 and by leads 42 with the two cooperating electrodes 19 in the upper loop portion 16 of the syphon tube 15. Further leads 43 connect the control system 40 to the coil of an electro-magnetically controlled switch 46 arranged in the circuit 47 of an electric drive motor 10a for the pump 10 and leads 44 connect the control system 40 with the control solenoid 45 of the electro-magnetically controlled valve 14. The control system 40 operates in such a way that when the electrical level limiting switch comprising the electrodes 6 and 8 responds, the switch 46 is actuated to open the circuit 47 and disconnect the pump driving motor 10a and, after a time delay of 10–20 seconds, the solenoid 45 is energized to open the valve 14 whereas when the level limiting switch comprising the electrodes 19 responds, the solenoid 45 is again de-energized whereby the valve 14 is closed and, after a time delay of 10–20 seconds, the switch 46 is again actuated to close the circuit of the pump driving motor 10a. Preferably, the control system 40 further comprises circuit elements causing the disconnection of the electrodes 6 and 8, and 19, respectively, immediately after the two level limiting switches comprising these electrodes have responded so as to remove voltage from these electrodes whereas the electrodes 6 and 8 are again put under voltage when the pump 10 is again started and the two electrodes 19 are put under tension when the valve 14 is again opened. To carry out these control functions, the control system 20 may be composed of conventional electrical and electronic circuit elements arranged in a manner well known to the expert and this control system has, therefore, not been shown in further detail.

The apparatus operates as follows.

At the beginning of a mixing cycle the mixing tank 1 is empty and the valve 14 is closed. By the closing of the switch 46 the pump 10 is started so as to pump liquid concentrate from the storage tank 11 through the conduit 9 and the inlet tube 5 into the primary mixing tank 1. As soon as the rising liquid level reaches the lower end of the electrode 6, the circuit of the liquid level limiting switch 6, 8 is closed causing the centrifugal pump 10 to be disconnected. The conduit 5, 12, 9 now forms a syphon tube connecting the tank 1 through the centrifugal pump 10 with the storage tank 11 whereby the surplus of liquid in the mixing tank 1 is sucked out of this tank and returned to the storage tank until the liquid level in the mixing tank 1 has fallen to the level of the mouth 7 of the inlet tube 5 and the syphon action is stopped by the entrance of air into this tube 5. The mixing tank 1 then contains exactly the required amount of concentrate. After the above mentioned time delay of about 10– 20 seconds the control system 40 energizes the solenoid 45 whereby the valve 14 is opened and soft water under pressure flows through the inlet conduit 13 with a whirling motion into the lower mixing tank portion 4 where it is mixed intimately with the liquid concentrate in this lower tank portion. Simultaneously with the rising of the liquid level in the mixing tank 1 the liquid rises in the leg 15a of the syphon discharge tube 15 connected to the lower mixing tank portion 4. When the liquid level in this tube leg 15a reaches the upper loop portion 16 and makes contact with the two electrodes 19 of this second liquid level limiting switch the circuit of this switch is closed whereby the valve 14 is immediately actuated shutting-off the further supply of soft water to the mixing tank 1. At this moment, exactly the right amount of soft water has been supplied as required to obtain the desired mixing ratio with the concentrate previously fed to the mixing tank 1. Also at this moment the syphon discharge tube 15 starts drawing-off the contents of the mixing tank 1 discharging the same into the second mixing tank 18. After a second time delay of 10–20 seconds sufficient for completely emptying the primary mixing tank 1, the pump 10 is against started for the next mixing cycle.

The mixed dialysate flowing into the tank 18 is further mixed by the stirring device 20. As soon as the liquid level in the tank 18 reaches the level of the upper loop portion of the syphon tube 21, the liquid starts flowing from the tank 18 into the buffer tank 22. Since, however, the tube mouth 23 is situated at a relatively high level above the bottom of the tank 18, a certain amount of liquid remains in this tank which is mixed with the liquid discharge into the tank 18 during the next mixing cycle. This remaining liquid can also flow at a small rate through the narrow drain-pipe 24 directly into the buffer tank 22. The pump 26 feeds the dialysate from the buffer tank 22 through the line 27 to the artificial kidney (not shown), the concentration of the dialysate being checked by the measuring cell 28. The feed pressure in the line 27 can be adjusted by means of the regulating valve 30.

When all the concentrate in the storage tank 11 has been used and the operation of the apparatus is stopped, the several tanks and conduits of the apparatus can be flushed with hot water in the manner as above described. When the apparatus should again be put in operation, the storage tank 11 is first filled with fresh concentrate and then the apparatus is put through a number of mixing cycles without connecting the feed line 27 to the artificial kidney in order to remove water that may have remained in the system after the flushing thereof and that could disturb the proper mixing ratio.

Preferably the inlet tube 5 is vertically adjustable to allow the amount of concentrate supplied to the mixing tank 1 at each operating cycle, and thereby the mixing ratio, to be regulated.

It is further of advantage to provide the apparatus with an output of mixed liquid which on continuous operation of the apparatus is greater than the amount of liquid normally required per unit of time by the artificial kidney to be connected to the line 27. In that case, each following mixing cycle should only be initiated when the buffer tank 22 has been sufficiently emptied to be able to receive the contents of the mixing tank 1 through the intermediate tank 18. For that purpose, the buffer tank 22 is preferably also provided with upper and lower liquid level signalling means, such as an upper electrode 48 and a lower electrode 49 projecting into the tank 22 and insulated from the metal tank wall which electrodes are connected to the control system 40 by leads not shown. The arrangement can be such that when the liquid in the tank 22 reaches the level of the upper electrode 48, a signal is given preventing the actuation of the motor switch 46 and thus preventing the next mixing cycle from starting whereas when the liquid level in the buffer tank 22 has descended below the lower electrode 49 a second signal is given which again allows the actuation of the motor switch 46.

Although the apparatus according to the invention has been shown and described with reference to an embodiment thereof, several modifications can be resorted to within the scope of the invention.

What is claimed is:

1. An apparatus for preparing and dispensing a mixture of at least two liquids in a predetermined mixing ratio, particularly for preparing a dialysate for an artificial kidney, comprising a mixing tank; first supply means for feeding a measured quantity of a first one of said two liquids to said mixing tank; first control means for controlling the operation of said first supply means; second supply means for feeding the second one of said two liquids to said mixing tank; means for actuating said second supply means after the operation of said first supply means has terminated; a discharge conduit for removing the mixed liquid from said mixing tank, said discharge conduit comprising a syphon tube having an upstanding leg portion, a depending leg portion and an upper loop portion connecting the upper ends of said two leg portions, said upstanding leg portion being at its lower end in communication with said mixing tank closely adjacent the bottom of the latter, said depending leg portion extending downwardly past the bottom level of said mixing tank and said upper loop portion being situated at a level corresponding to a predetermined liquid level in said mixing tank; means for receiving the liquid flowing out of said discharge conduit; and second control means for terminating the operation of said second supply means, said second control means including liquid level responsive means actuated when the liquid reaches said predetermined level of said upper loop portion, whereby the feed of said second liquid to said mixing tank is stopped at the moment the rising liquid level in said mixing tank reaches the level of said syphon tube upper loop portion and the liquid starts flowing out of said tank through said syphon tube.

2. The apparatus of claim 1 in which said first supply means comprises a liquid storage tank, a pump means of the type allowing, when at rest, a free back-flow therethrough, said pump means communicating with said storage tank, and a loop-shaped feed tube having a rising leg portion connected at its lower end to said pump means and a depending leg portion extending downwardly into said mixing tank from the upper side thereof to a selected level in said tank, said storage tank and pump means being arranged below said latter selected level, said first control means comprising liquid level responsive means arranged inside said mixing tank at a small distance above said selected level and controlling the termination of the operation of said pump means whereby after such termination a quantity of liquid is returned from said mixing tank towards said storage tank through syphon action of said loop-shaped feed tube until the liquid level in said mixing tank has dropped to said selected level.

3. The apparatus according to claim 1 in which said second supply means actuating means comprises time delay means whereby upon the termination of the operation of said first supply means said second supply means is actuated after a predetermined time delay.

4. The apparatus of claim 1 in which said first control means comprises time delay means whereby upon the termination of the operation of said second supply means said first supply means is automatically actuated after a predetermined time delay.

5. The apparatus of claim 1 in which said second control means comprises electrical liquid responsive means including two spaced electrodes arranged inside said syphon discharge tube upper loop portion.

6. The apparatus of claim 1 in which said second supply means for said second liquid comprises an electro-magnetically controlled shut-off type of valve.

7. The apparatus of claim 1 in which said mixing tank has a portion of reduced cross-section adjacent said syphon discharge tube upper loop portion.

8. The apparatus of claim 2 in which said mixing tank has a portion of reduced cross-section at said selected level in said mixing tank.

9. The apparatus of claim 1 in which said second supply means comprises an inlet conduit connected to said mixing tank close above the bottom thereof, said mixing tank having a lower tank portion of substantially spherical shape, said inlet conduit debouching substantially tangentially in said mixing tank lower portion.

10. The apparatus of claim 1 comprising a second mixing tank located below the bottom level of said first mixing tank; stirring means arranged in said second mixing tank, said syphon discharge tube depending leg extending downwardly into said second mixing tank; a buffer tank arranged below the bottom level of said second mixing tank; a second loop-shaped syphon discharge tube having an upstanding leg portion communicating at its lower end with said second mixing tank and a depending leg portion extending downwardly into said buffer tank whereby the liquid content of said second mixing tank is periodically transferred to said buffer tank, the lower of said upstanding leg portion of said second syphon discharge tube being vertically spaced from the bottom of said second mixing tank; and including a drain pipe of narrow cross-section opening into the bottom of said second mixing tank and leading to said buffer tank.

11. The apparatus of claim 1 further comprising a buffer tank located below the bottom level of said mixing tank, said syphon discharge tube depending leg communicating with said buffer tank; and upper and lower liquid level responsive means arranged in said buffer tank and controlling the operation of said first supply means whereby said first supply means is prevented from operating when the liquid level in the buffer tank has reached said upper liquid level responsive means and is again permitted to operate when the liquid level has fallen below the level of said lower liquid level responsive means.

12. An apparatus for preparing and dispensing a mixture of at least two liquids in a predetermined mixing ratio, particularly for preparing a dialysate for an artificial kidney, comprising; a mixing tank; first supply means for feeding a measured quantity of a first one of said two liquids to said mixing tank; first control means for controlling the operation of said first supply means, second supply means for feeding the second one of said two liquids to said mixing tank; means for actuating said second supply means after the operation of said first supply means has terminated, and means for discharging the mixed liquid from said mixing tank; said first supply means comprising a liquid storage tank, a pump means allowing, when at rest, a free back-flow therethrough, said pump means communicating with said storage tank, and a loop-shaped feed tube having a rising leg portion connected at its lower end to said pump means and a depending leg portion extending downwardly into said mixing tank from the upper side thereof to a selected level in said tank, said storage tank and pump means being arranged below said latter selected level, said first control means comprising liquid level responsive means arranged inside said mixing tank at a small distance above said selected level and controlling the termination of the operation of said pump means whereby after such termination of quantity of liquid is returned from said mixing tank towards said storage tank through syphon action of said loop-shaped feed tube until the liquid level in said mixing tank has dropped to said selected level.

13. The apparatus of claim 12 in which said pump means is a centrifugal pump.

14. The apparatus according to claim 12 in which said depending leg portion of said loop-shaped feed tube is adjustable in the vertical direction.

15. The apparatus of claim 12 in which said liquid level responsive means of said first control means operates electrically and includes two spaced electrodes arranged inside said mixing tank.

16. The apparatus according to claim 15 in which one of said spaced electrodes of said first control means consists of a substantially tubular metal member arranged about said depending leg portion of said feed tube, the lower end of said latter depending leg portion projecting downwardly past the lower end of said tubular member, the other one of said two electrodes being arranged below said tubular member lower end.

* * * * *